United States Patent
Gu et al.

(10) Patent No.: US 9,015,788 B2
(45) Date of Patent: *Apr. 21, 2015

(54) GENERATION AND PROVISION OF MEDIA METADATA

(71) Applicant: Microsoft Corporation, Redmond, WA (US)

(72) Inventors: Chuang Gu, Bellevue, WA (US); Anil Murching, Redmond, WA (US); Chad Gibson, Seattle, WA (US); David Alles, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,903

(22) Filed: May 19, 2014

(65) Prior Publication Data

US 2014/0250487 A1      Sep. 4, 2014

Related U.S. Application Data

(63) Continuation of application No. 12/964,597, filed on Dec. 9, 2010, now Pat. No. 8,763,068.

(51) Int. Cl.
*H04N 7/16* (2011.01)
*H04N 21/44* (2011.01)
(Continued)

(52) U.S. Cl.
CPC .... *H04N 21/44008* (2013.01); *G06F 17/30825* (2013.01); *G06F 17/3082* (2013.01);
(Continued)

(58) Field of Classification Search
CPC ............ H04N 5/4401; H04N 7/17318; H04N 21/4622; H04N 21/435; H04N 21/84
See application file for complete search history.

(56) References Cited

U.S. PATENT DOCUMENTS

| 6,741,655 B1 | 5/2004 | Chang et al. |
| 7,657,126 B2 | 2/2010 | Gokturk et al. |

(Continued)

FOREIGN PATENT DOCUMENTS

| EP | 2136314 A1 | 12/2009 |
| WO | 0169936 A2 | 9/2001 |
| WO | 2011018634 A1 | 2/2011 |

OTHER PUBLICATIONS

"Clickthrough", http://www.clickthrough.com, Accessed Oct. 18, 2010, 1 page.

(Continued)

*Primary Examiner* — Nathan Flynn
*Assistant Examiner* — Alfonso Castro
(74) *Attorney, Agent, or Firm* — Bryan Webster; Kate Drakos; Micky Minhas

(57) ABSTRACT

Various embodiments related to the generation and provision of media metadata are disclosed. For example, one disclosed embodiment provides a computing device having a logic subsystem configured to execute instructions, and a data holding subsystem comprising instructions stored thereon that are executable by the processor to receive an input of a video and/or audio content item, and to compare the content item to one or more object descriptors each representing an object for locating within the content item to locate instances of one or more of the objects in the content item. The instructions are further executable to generate metadata for each object located in the video content item, and to receive a validating user input related to whether the metadata generated for a selected object is correct.

20 Claims, 3 Drawing Sheets

(51) Int. Cl.

| | |
|---|---|
| *G06F 17/30* | (2006.01) |
| *H04N 5/44* | (2011.01) |
| *H04N 7/173* | (2011.01) |
| *H04N 21/235* | (2011.01) |
| *H04N 21/435* | (2011.01) |
| *H04N 21/81* | (2011.01) |
| *H04N 21/84* | (2011.01) |
| *H04N 21/2665* | (2011.01) |
| *H04N 21/472* | (2011.01) |

(52) U.S. Cl.
CPC ......... *H04N5/4403* (2013.01); *H04N 7/17318* (2013.01); *H04N 21/2353* (2013.01); *H04N 21/435* (2013.01); *H04N 21/8133* (2013.01); *H04N 21/84* (2013.01); *H04N 21/2665* (2013.01); *H04N 21/472* (2013.01)

(56) References Cited

U.S. PATENT DOCUMENTS

| | | | |
|---|---|---|---|
| 2005/0086223 | A1* | 4/2005 | Rui .................................. 707/5 |
| 2007/0033170 | A1 | 2/2007 | Sull et al. |
| 2007/0050406 | A1 | 3/2007 | Byers |
| 2008/0212899 | A1 | 9/2008 | Gokturk et al. |
| 2009/0049084 | A1 | 2/2009 | Cho |
| 2009/0216745 | A1 | 8/2009 | Allard |
| 2010/0082585 | A1 | 4/2010 | Barsook et al. |
| 2013/0028522 | A1 | 1/2013 | Perlmutter et al. |

OTHER PUBLICATIONS

"VS MetaFrame", http://www.digitalsmiths.com/metaframe, Accessed Oct. 18, 2010, 1 page.
"VS Publisher", http://www.digitalsmiths.com/publisher, Accessed Oct. 18, 2010, 1 page.
"VS Intelligence", http://www.digitalsmiths.com/intelligence, Accessed Oct. 18, 2010, 1 page.
"VideoSense for TV Everywhere", http://www.digitalsmiths.com/tveverywhere, Accessed Oct. 18, 2010, 2 pages.
"VS Asset Manager", http://www.digitalsmiths.com/assetsmanager, Accessed Oct. 18, 2010, 1 page.
"Unleash Your Media and Build Your Audience", http://www.digitalsmiths.com/downloads/Digitalsmiths_Videosense_Datasheet.pdf, Available as early as Jan. 1, 2009, 2 pages.
"VideoSense", http://www.digitalsmiths.com/products, Accessed Oct. 18, 2010, 1 page.
Veltkamp, Remco C. et al., "Content-Based Image Retrieval Systems: A Survey", Department of Computing Science Utrecht Univ., Oct. 28, 2002, 62 pages.
Tous, Ruben et al., "An Architecture for TV Content Distributed Search and Retrieval Using the MPEG Query Format (MPQF)", Ambi-sys, Feb. 2008, 8 pages.
Smith, John R., "The MPEG Query Format: Unifying Access to Multimedia Retrieval Systems", Oct. 2008, IEEE Computer Society, pp. 82-95.
"Miracle and the Content Analysis Engine (CAE)", http://www.research.att.com/projects/Video/Miracle/index.html, Accessed May 4, 2011, 2 pages.
Jung, Byunghee et al., "Automated Content-Based Video Retrieval System using MPEG-7 Metadata", Korean Broadcasting System, Sep. 2004, pp. 12-17.
"interactiveTV Today", http://itvt.com/, Accessed May 4, 2011, 4 pages.
ISO/IEC 15938-12 Information technology—Multimedia content description interface Part 12: Query format, Dec. 15, 2008, pp. 1-130.
Gagnon, L. et al., "MPEG-7 audio-visual indexing test-bed for video retrieval", Jan. 2004, SPIE Internet Imaging V, 11 pages.
State Intellectual Property Office of the People's Republic of China, Office Action of Chinese Patent Application No. 201110430523.6, Dec. 3, 2013, 16 pages.
State Intellectual Property Office of the People's Republic of China, Office Action of Chinese Patent Application No. 201110430523.6, May 13, 2014, 16 pages.
Patent Office of the State Intellectual Property Office of the People's Republic of China, Final Office Action Issued in Application No. 201110430523.6, Nov. 4, 2014, 14 pages.

* cited by examiner

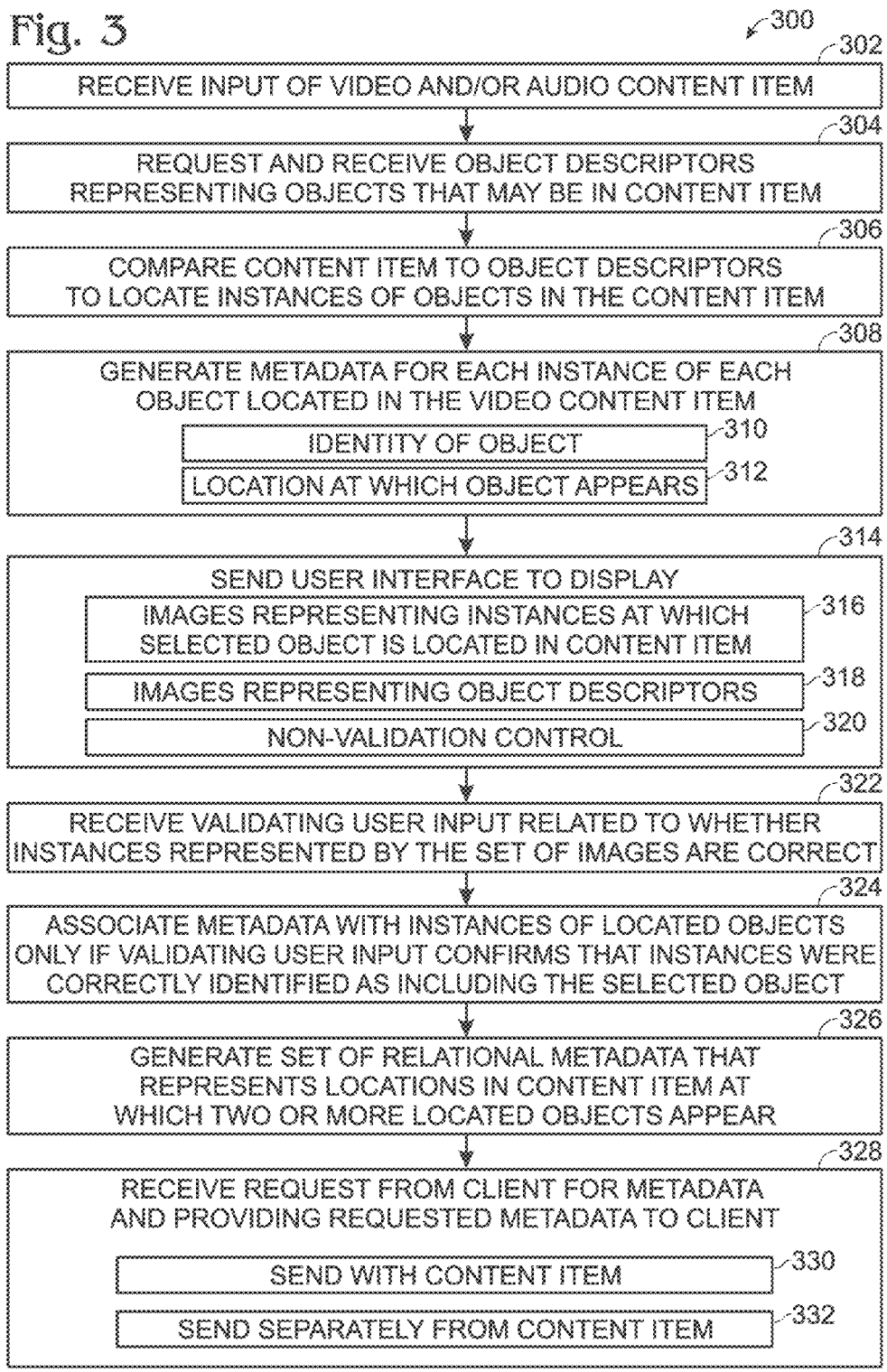

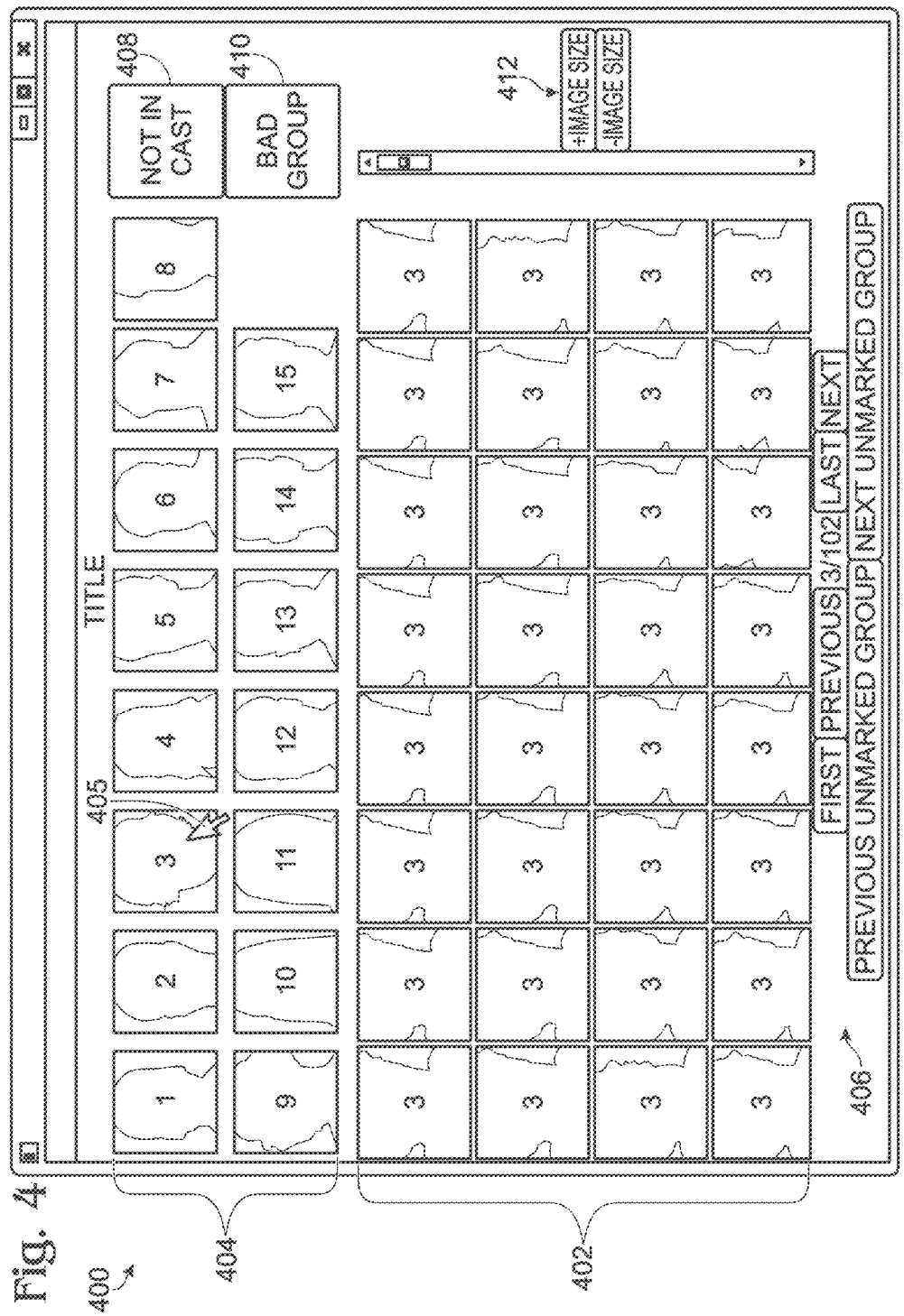

GENERATION AND PROVISION OF MEDIA METADATA

CROSS-REFERENCE TO RELATED APPLICATIONS

This application is a continuation of U.S. patent application Ser. No. 12/964,597, filed on Dec. 9, 2010, and titled "GENERATION AND PROVISION OF MEDIA METADATA" the entire disclosure of which is incorporated by reference.

BACKGROUND

Metadata is commonly provided for digital video and/or audio content to describe various aspects of a video and/or audio content item. For example, a video content item may have associated metadata that contains information such as the title, cast members, producer, director, year of production, and the like. Such metadata generally applies globally to the entirety of the video and/or audio content item.

For example, hypervideo may contain intra-media metadata related to objects (such as people) contained within portions of the video content. More specifically, hypervideo contains user-selectable metadata links embedded within a video item that allow viewers to navigate to other content by interacting with the links. Due to the large number of individual image frames contained within a typical digital video and/or audio content item, as well as the potentially large number of objects that may appear in any individual frame, generating and including metadata at the desired locations within a video and/or audio content item may be difficult and time-consuming

SUMMARY

Various embodiments related to the generation and provision of intra-media and/or inter-metadata for video and/or audio media content are disclosed. For example, one disclosed embodiment provides a computing device comprising a logic subsystem configured to execute instructions, and a data holding subsystem comprising instructions stored thereon that are executable by the processor to receive an input of a video and/or audio content item, and compare the video and/or audio content item to one or more object descriptors each representing an object for locating within the video and/or audio content item to locate instances of one or more of the objects in the video and/or audio content item. The instructions are further executable to generate video metadata for each object located in the video and/or audio content item, and to receive a validating user input related to whether the metadata generated for a selected object is correct.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows a flow diagram depicting another embodiment of generating metadata for video and/or audio content.

FIG. 4 shows a schematic depiction of an embodiment of a user interface configured to allow the efficient validation of computer-generated metadata.

DETAILED DESCRIPTION

Figure 1:
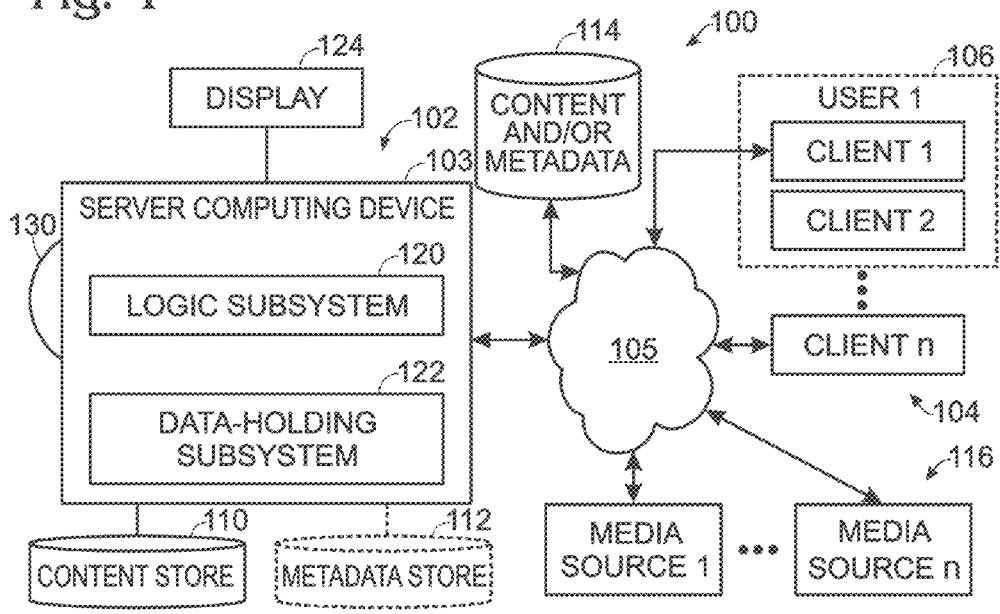
FIG. 1 shows an embodiment of a video and/or audio use environment for the generation and consumption of intra-media and inter-media metadata.

In light of the time-consuming and difficult nature of manually generating intra-media and inter-media metadata for video and/or audio content, embodiments are disclosed herein related to the automatic generation of such metadata. Embodiments are also disclosed herein that relate to human-assisted automatic metadata generation and recognition. As will be described in more detail below, this may help to achieve the advantages of computing power to rapidly generate metadata and of human recognition to accurately recognize and validate such metadata.

Prior to describing the generation and provision of intra-media and inter-media metadata for video and/or audio content, an example video and/or audio use environment 100 is described with reference to FIG. 1. Video and/or audio use environment 100 comprises a video and/or audio content server system 102, which may comprise one or more physical computing devices 103. Video and/or audio content server system 102 is configured to provide video and/or audio content to client devices 104, illustrated as an arbitrary number n of client devices, via a network 105. Client devices 104 may comprise any suitable types of devices, including but not limited to televisions, set-top boxes, smart phones, portable media players, desktop computers, laptop computers, notepad computers, etc. In some instances, a user, indicated by dashed-line box 106, may consume video content via multiple different client devices, as indicated by clients 1 and 2 inside of box 106. For example, a user may consume video and/or audio content on a television, a laptop computer, a notepad computer, and a mobile smart phone, and all of these devices may be linked to the user via user account information stored on or otherwise accessible by video and/or audio content server system 102.

Video and/or audio content server system 102 further comprises, or otherwise is configured to access, a video and/or audio content store 110 comprising video and/or audio content items for provision to client devices 104. The video and/or audio content items in video and/or audio content store 110 may be configured to be streamed to the client devices 104 and/or downloadable by client devices 104 for later consumption. In some scenarios, video and/or audio may be consumed on one device (e.g. a television), while metadata is received and consumed on another, companion device (e.g. a smart phone). Further, it will be understood that metadata may be generated and provided for video and/or audio content consumed via removable storage media such as compact discs (CDs), digital versatile discs (DVDs), and other such removable storage media.

Various items of metadata, including but not limited to inter-media metadata and intra-media metadata for video and/audio content, may be stored for each video and/or audio content item in video and/or audio content store 110. Some metadata may be bundled with a corresponding video and/or audio content item and stored with the video and/or audio content item, while other metadata may be stored separately from an associated video and/or audio content item so that it may be provided to a client separately from the associated video and/or audio content item. This separately-stored metadata is signified in FIG. 1 by metadata store 112, but it will be understood that separately stored metadata may be stored in either a same or different database than an associated video and/or audio content item. It further will be understood that video and/or audio content items and/or metadata also may be stored in remote locations accessible by video and/or audio content server system 102 via network 105, as shown in FIG. 1 at 114.

It will be understood that the media served by the video and/or audio content server system 102 may optionally be encrypted. As such, an authentication/licensing/decryption scheme may be built into each of the clients and into metadata generation logic. Encryption/content protection schemes may also be applied to metadata as well as to media content.

As will be described in more detail below, the video and/or audio content server system 102 is configured to receive video and/or audio content items from media sources 116, illustrated as an arbitrary number n of media sources, and to process the video and/or audio content items to generate metadata for the video and/or audio content items. As such, the video and/or audio content server system 102 comprises a logic subsystem 120 configured to execute instructions stored in a data-holding subsystem 122 to perform various functions related to the generation of metadata for video and/or audio content items, and to provide the video and/or audio content items and associated metadata for the video and/or audio content items to requesting client devices 104.

The video and/or audio content server system 102 is further illustrated as comprising a display 124 for the presentation of a user interface related to the validation of metadata generated for a video and/or audio content item. As described in more detail below, metadata may be validated by a user of the video and/or audio content server system 102, by consumers operating client devices 104, and/or by an automated service.

It is to be understood that any suitable computer architecture may be used for video and/or audio content server system 102 without departing from the scope of this disclosure. Further, video and/or audio content server system 102 may comprise any other suitable components other than those depicted in FIG. 1, including but not limited to user input devices such as keyboards, mice, game controllers, cameras, microphones, and/or touch screens, for example.

Logic subsystem 120 may include one or more physical devices configured to execute one or more instructions. For example, logic subsystem 120 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 120 may include one or more processors that are configured to execute software instructions. Additionally or alternatively, logic subsystem 120 may include one or more hardware or firmware logic machines configured to execute hardware or firmware instructions. Processors of logic subsystem 120 may be single core or multicore, and the programs executed thereon may be configured for parallel or distributed processing. Logic subsystem 120 may optionally include individual components that are distributed throughout two or more devices, which may be remotely located and/or configured for coordinated processing. One or more aspects of logic subsystem 120 may be virtualized and executed by remotely accessible networked computing devices configured in a cloud computing configuration.

Data-holding subsystem 122 may include one or more physical, non-transitory, devices configured to hold data and/or instructions executable by the logic subsystem to implement the herein described methods and processes. When such methods and processes are implemented, the state of data-holding subsystem 122 may be transformed (e.g., to hold different data).

Data-holding subsystem 122 may include removable media and/or built-in devices. Data-holding subsystem 122 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 122 may include devices with one or more of the following characteristics: volatile, nonvolatile, dynamic, static, read/write, read-only, random access, sequential access, location addressable, file addressable, and content addressable. In some embodiments, logic subsystem 120 and data-holding subsystem 122 may be integrated into one or more common devices, such as an application specific integrated circuit or a system on a chip.

FIG. 1 also shows an aspect of the data-holding subsystem in the form of removable computer-readable storage media 130, which may be used to store and/or transfer data and/or instructions executable to implement the herein described methods and processes. Removable computer-readable storage media 130 may take the form of CDs, DVDs, HD-DVDs, Blu-Ray Discs, EEPROMs, magnetic memory devices and/or floppy disks, among others.

It is to be appreciated that a "service", as used herein, may be an application program executable across multiple user sessions and available to one or more system components, programs, and/or other services. In some implementations, a service may run on a server responsive to a request from a client.

Display 124 may be used to present a visual representation of data held by data-holding subsystem 122. As the herein described methods and processes change the data held by the data-holding subsystem, and thus transform the state of the data-holding subsystem, the state of display 124 may likewise be transformed to visually represent changes in the underlying data. Display 124 may include one or more display devices utilizing virtually any type of technology. Such display devices may be combined with logic subsystem 120 and/or data-holding subsystem 122 in a shared enclosure, or such display devices may be peripheral display devices. Further, in some embodiments, one or more audio outputs (e.g. speakers) may be included to present an audio representation of data held by data-holding subsystem 122, and/or one or more audio inputs may be provided to receive audio inputs such as voice commands.

Figure 2:
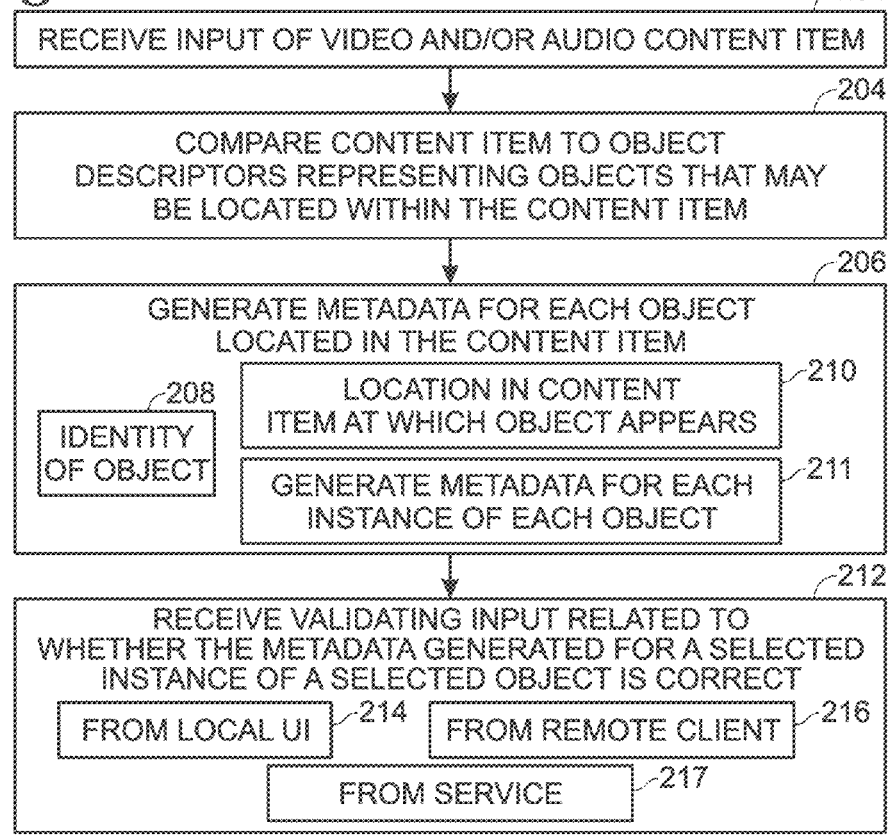
FIG. 2 shows a flow diagram depicting an embodiment of a method of generating metadata for video and/or audio content.

FIG. 2 shows a flow diagram depicting an embodiment of a method 200 for generating metadata for a video and/or audio content item. Method 200 comprises, at 202, receiving an input of a video and/or audio content item, and at 204, comparing the video and/or audio content item to one or more object descriptors, wherein each video object descriptor represents an object that may be located in the video and/or audio content item. The object descriptors may comprise, for example, representations of the faces of persons appearing in the video and/or audio content item. This may allow facial recognition techniques to be used to identify the faces of actors in the individual image data frames that make up the video and/or audio content item. Likewise, the object descriptors may comprise representations of animals, of inanimate objects located in the video and/or audio content item, of songs utilized in a sound track of the video and/or audio content item, and/or any other suitable intra-video objects. Further, the object descriptors may comprise functions and/or data to help identify intra-video and/or intra-audio events, such as scene changes, in the video and/or audio content item. It will be understood that the video and/or audio content item may comprise an entire video content selection, or any subportion of a video content selection, such as a scene, shot, or even a single frame.

Method 200 next comprises, at 206, generating metadata for each object located in the video and/or audio content item. This may comprise, for example, generating a list of identities 208 of objects located in the video and/or audio content item, and also generating a list of locations 210 in the form of times and/or image frame coordinates at which each object appears in the video and/or audio content item. Further, in some embodiments, metadata is generated for each instance of each object located in the video and/or audio content item, as shown at 211. It will be understood that the term "location" as used herein may refer to a temporal location and/or a physical location within a particular image data frame (e.g. a rectangle bounding box referenced to a specific image frame). Further, the metadata generated may comprise a list of scene breaks in the video and/or audio content item, and/or may list any other suitable intra-video objects. It will be understood that the processing of the video and/or audio content item to generate the metadata may occur locally and/or remotely, for example, via a distributed computer network.

Next, method 200 comprises, at 212, receiving a validating input related to whether the metadata generated for a selected instance of a selected object is correct. As mentioned above, the automated identification of objects in a video may generate large quantities of metadata more rapidly than can be done manually, but also may lack the precision and accuracy of human identification of the objects. Therefore, method 200 may provide for the human-assisted validation of the metadata, which may help to ensure the reliability of the metadata associated with a video and/or audio content item. In other embodiments, a validating input may come from a service component, rather than users.

Where the validating input is received from a user, the validating user input may be received via a local user interface from a user performing the video and/or audio content item intake/metadata generation process, as indicated at 214, and/or via a remote client device from a consumer during consumption of the metadata, as indicated at 216. Further, as mentioned above, the validating user input may be received from an automated service, as indicated at 217. Validation of the correctness of the generated metadata at the time of generation may help to prevent the transmission of incorrect metadata to consumers. Likewise, receipt of the validating input from a consumer of the metadata may help to prevent the transmission of incorrect metadata to later consumers of the metadata. In some circumstances, for example, where a video and/or audio content item has a low relative profit expectations, it may be desirable not to validate during the intake process and instead have the validation process occur solely at the consumption stage. In such embodiments, consumers may be offered an incentive for pointing out any erroneous information in the metadata.

The video and/or audio content item input 202 may be received in any suitable manner. For example, the video and/or audio content item may be received in raw format or in encoded format. Further, the video and/or audio content item may be received in a streaming mode, or in a download to own (DTO) mode. The generated metadata may be stored as bundled with the video and/or audio content item, or may be stored separately so that it may be provided separately, as mentioned above. Additionally, the video and/or audio content item may be purchased in the form of a removable media storage device, in which case the metadata may be stored and provided separately.

FIG. 3 shows a flow diagram depicting a more detailed embodiment of a method of generating metadata for a video and/or audio content item. Method 300 comprises, at 302, receiving an input of a video and/or audio content item, and at 304, requesting and receiving a set of object descriptors that represent objects that may be in the video and/or audio content item. For example, where the video and/or audio content item is a movie or television show, the video and/or audio content server may determine an identity of the show, and then may send a request to an external service for a set of object descriptors comprising a list of actors in the cast of the movie or show and a set of images (or other digital representations) of the actors. Likewise, where the video and/or audio content item has a musical soundtrack, the video and/or audio content server may send a request to an external service for the songs, or clips from the songs, contained within the soundtrack. Similar methods may be used to obtain object descriptors to locate inanimate objects, animals, etc. in the video and/or audio content item. It will be understood that the cast, soundtrack song list, and other such general metadata items for a video and/or audio content item may be included with the video and/or audio content item as received and/or from various external services.

Method 300 next comprises, at 306, comparing the video and/or audio content item to the object descriptors to locate any instances in the video and/or audio content item of the objects represented by the object descriptors. Then, for each instance of each object located, method 300 comprises, at 308, generating metadata. As mentioned above, the generated metadata may be intra-media and/or inter media metadata, and may comprise any suitable information, including but not limited to an identity assigned to the located object and a location (temporal and/or spatial) at which the located object appears in the video and/or audio content item.

Either during or after the location of instances of objects and the generation of metadata for the instances, method 300 comprises, at 314, sending a representation of a user interface to a display device or other suitable output device (e.g. an audio output device), wherein the user interface displays a set of images 316 obtained from the image frames of the video and/or audio content item, the set of images representing instances at which a selected object was located in the video and/or audio content item. Further, in some embodiments, an audio output may be presented to the user in addition to, or instead of, via a display. As described below, this user interface is then used to receive a validating user input (or other validating input, e.g. from a service), as indicated at 322, to validate the metadata based upon whether the object instances represented by the set of images were correctly identified. Alternatively and/or additionally, the validating user input may be received via an audio input, or in any other suitable manner. Then, as 324, the generated metadata may be associated with the identified located object instances for provision to a client device only if the validating user input confirms that the object instances were correctly identified.

The user interface may comprise any suitable information and/or controls to facilitate the validation of the generated metadata for the located object instances. For example, as shown at 318, the user interface may comprise images that represent the object descriptors. Such images may act as user interface controls selectable by a user to validate the correctness of an identified object instance, and thereby to validate the metadata generated for that instance. Further, the user interface may comprise one or more non-validation controls that may be used to reject any incorrect identification of object instances, and therefore to invalidate the metadata generated for that instance. In some embodiments, such non-validation control or controls may be configured to apply globally to all object instances depicted on the user interface.

FIG. 4 shows an example embodiment of a user interface 400 that may be used to rapidly validate or invalidate large quantities of generated metadata. It will be understood that the term "validating user input" as used herein may refer to user inputs that validate or invalidate generated metadata.

User interface 400 comprises a first field 402 that contains a representation of each instance of a particular object's detected appearance in a video and/or audio content item as identified by an automated search of the video and/or audio content item, wherein each instance is illustrated by an image of the identified object (shown as an outline of a character's head in FIG. 4) taken from a frame of the image data. First field 402 is configured to be scrollable, or otherwise to allow the inclusion of more data than can be displayed at one time.

User interface 400 further includes a second field 404 that contains a representation of each video object descriptor used to identify object instances. In the depicted embodiment, the second field 404 includes a list of images of the faces of cast members in the video and/or audio content item. As illustrated, a user may select an image of a cast member's face (actor 3 in the depicted embodiment), for example, with a cursor 405, a touch input, or in any other suitable manner, to make a single validating input for all instances represented by the set of images. Thus, a single validating input is received for the generated metadata for all of the instances of a selected object via the selection of an image in second field 404. After performing this process for one group of identified object instances, navigation controls 406 allow a user to navigate to display another set of images representing instances at which another selected object is located in the video and/or audio content item, and then to make another validating input.

In some instances, not all of the images shown in first field 402 may identify a same object. For example, where a selected object identifier corresponds to a cast member, one or more of the images shown may identify a different cast member, a non-cast member (e.g. an extra), or an inanimate object (e.g. a statue, clock face, etc.). Thus, user interface 400 comprises invalidation controls that allow the invalidation of metadata generated for these incorrectly identified object instances. In the depicted embodiment, the user interface comprises an example single-item invalidation control 408 and a global invalidation control 410. The single item invalidation control 408 is labeled "not in cast," and allows a user to select (via cursor, touch screen, etc.) an image of the incorrectly identified object instance from the first field 402, and then select the single item invalidation control 408 to invalidate the metadata generated for that item. After the incorrectly identified object instances are invalidated, the remaining object instances may be validated as a group via selection of an image from second field 404, as described above. Likewise, global invalidation control 410, labeled "bad group," allows all object instances shown by the displayed set of images in first field 402 to be invalidated by receipt of a single validation input. In this manner, a clearly erroneous group of object identifications may be quickly rejected without having to reject each erroneously identified object instance individually.

FIG. 4 also shows other example user interface controls. For example, image size adjustment controls 412 may be used to zoom in on or out from a particular image to aid in the validation process. It will be understood that the depicted embodiment of a user interface is shown for the purpose of example, and is not intended to be limiting in any manner.

Returning to FIG. 3, in some embodiments, additional post-validation processing may be performed to generate additional metadata. For example, as indicated at 326, relational metadata may be generated by determining segments of the video and/or audio content item in which two or more identified objects appear at the same time, and then generating metadata regarding the identities and locations (temporal and/or positional) of the objects in these overlapping instances of the objects. This may aid in content discovery, for example, by allowing consumers of video content to perform more granular searches for desired video content.

As a more specific example of the use of relational metadata, relational metadata may be used to identify a previously-viewed movie or television show in which the consumer can remember a scene in which two or more favorite characters or other objects appear. Upon discovering the remembered scene, the consumer may then view just the requested scene, or may view the entire video and/or audio content item containing the requested scene. This may further allow intra-video viewing statistics to be collected, such that content providers may determine how many people view selected scenes in a video and/or audio content item. This may help to analyze usage statistics based upon how long various actors and/or objects appear in a video and/or audio content item, and therefore may allow advertising to be priced based upon the characteristics of a scene in which or adjacent to which such advertising is provided, rather than on the characteristics of the video and/or audio content item as a whole.

Method 300 next comprises, at 328, receiving a request from a client for metadata, and providing the metadata to the requesting client. In some instances, the metadata may be bundled with the video and/or audio content item. Thus, as indicated at 330, the request for the metadata may take the form of a request for the video and/or audio content item, and the metadata may be sent to the client bundled with the video and/or audio content item. In other instances, as indicated at 330, the metadata may be stored separately from the video and/or audio content item. Where stored separately, the metadata may be sent to the client upon request for the video and/or audio content item (i.e. the metadata is pushed to the client with the video and/or audio content item), whether streaming or downloaded), or may be sent separately from the video and/or audio content item on request (i.e. the metadata is pulled to the client).

As more specific examples of each of these scenarios, in the pull scenario, a consumer may pause video playback at time T and ask the video metadata delivery service to provide information about a video object (character or other) at position P in that video frame. Such interaction may occur in any suitable manner, including but not limited to via a user input device such as a cursor control device, via interactions with a motion sensor such as a three-dimensional depth camera, via voice commands detected by a microphone or microphone array, etc., to request more information on the object of interest. The video metadata service than sends the name or other information to be downloaded to the client. In contrast, in the push scenario, the client receives all of the metadata for the video and/or audio content item being viewed along with the video. Thus, the intra-video and inter-video metadata at time T and position P is immediately available to the consumer in the push scenario.

Some embodiments may employ a hybrid push-pull metadata delivery scenario. For example, in such an embodiment, a list of object positions P and times T may be pushed to client, whereas recent information, such as news, gossip, etc., about the object is pulled by client.

The provision of metadata as described above allows derivative metadata experiences associated either with a time offset or a visual position within a media item to be enabled and displayed. Some such metadata experiences may be entrance/exit experiences, while others may be statistic data based social experiences. As a non-limiting example of an entrance event, instead of subscribing to a content-based channel or channel associated with a particular broadcasting entity, a consumer may subscribe to a specific interesting person's "channel" where information content related to that particular person may be automatically notified/triggered, to the consumer or otherwise accessed by the consumer, in a wide range of visual granularity, from an entire movie or TV episode, down to a specific scene or even a single frame. It will be understood that the requested information may be sent to the device on which the consumer is viewing the video and/or audio content item, or to another device, such as a mobile phone, remote control, laptop computer, notepad computer, etc.

As a non-limiting example of an exit event, as described above, a consumer may pause playback, select via an input device a rectangle position P at time T during video playback, and display information such as the character's name, the actor's name playing the character, and other content in which that actor has appeared. The consumer may then exit and navigate into other information related to that character or actor, such as memorable/popular/quotable content/scene/frame within the content for that character. As another exit scenario, an overview of a selection of shows in which a given character can be viewed may be presented when that character leaves the scene of a particular content item.

As a non-limiting example of statistic data based social experiences, a consumer may receive real-time trending data (e.g. microblog trending data) pertaining to an actor who first enters the scene of a new television show. A consumer may also search for the statistic data regarding how many times an actor shows up in the video and/or audio content item to obtain a popularity distribution which may be displayed and recommended to friends on social network for further exploration.

Thus, by utilizing the automated identification of intra-video objects to produce metadata, combined with the human-assisted validation of such metadata to filter out any erroneous results, it may be possible to achieve a highly precise ratio of correctly-identified metadata while efficiently generating large amounts of metadata compared to manual metadata generations methods.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
a logic subsystem configured to execute instructions; and
a data holding subsystem comprising instructions stored thereon that are executable by the logic subsystem to:
receive an input of a video and/or audio content item;
compare the video and/or audio content item to one or more object descriptors each representing an object for locating within the video and/or audio content item to locate a plurality of instances of one or more of the objects in the video and/or audio content item;
generate metadata for each object located in the video and/or audio content item, the metadata for a corresponding object comprising an identity of the corresponding object;
output to a display device a user interface comprising a set of images representing the plurality of instances at which a selected object is located in the video and/or audio content item; and
receive a validating input via the user interface, the validating input comprising a lesser number of inputs than a number of instances represented by the set of images, the validating input related to whether the metadata generated for the selected object is correct.

2. The computing device of claim 1, further comprising instructions executable to display images representing the object descriptors in the user interface, and to receive the validating input by receiving an input selecting an image representing the object descriptor for the selected object.

3. The computing device of claim 1, wherein the user interface comprises a global non-validation control that allows a user to reject validation of all instances represented by the set of images.

4. The computing device of claim 1, further comprising instructions executable to, after receiving the validating input, display another set of images representing instances at which another selected object is located in the video and/or audio content item, and then receive another validating input.

5. The computing device of claim 1, wherein the instructions are executable to receive the validating input from a client device.

6. The computing device of claim 1, wherein the instructions are executable to bundle the metadata with the video and/or audio content item.

7. The computing device of claim 1, wherein the instructions are executable to save the metadata separately from the video and/or audio content item, and to send the metadata to a client separately from the video and/or audio content item.

8. The computing device of claim 1, wherein the instructions are executable to request the object descriptors after receiving the video and/or audio content item.

9. The computing device of claim 1, wherein the object descriptors comprise a list of actors in the video and/or audio content item.

10. The computing device of claim 1, further comprising instructions executable to generate relational metadata information related to locations in the video and/or audio content item at which two or more objects both appear in a frame of the video and/or audio content item.

11. The computing device of claim 1, wherein the instructions are further executable to receive a request for the metadata from a first client device, and to send the metadata to a second client that is associated with a same user as the first client device.

12. A computer-implemented method for associating intra-video metadata with one or more objects in a video content item, the method comprising:
receiving, by a processor of a computing device, an input of a video content item;

comparing, by the processor, the video content item to one or more video object descriptors each representing an object for locating within the video content item to locate a plurality of instances of one or more of the objects in the video content item;

generating, by the processor, intra-video metadata for each instance of each object located in the video content item, the intra-video metadata for a corresponding object comprising an identity of the corresponding object and a location within the video content item at which the corresponding object appears;

outputting, by the processor, to a display device a user interface comprising a set of images representing the plurality of instances at which a selected object is located in the video content item;

receiving, by the processor, a validating user input via the user interface, the validating user input comprising a lesser number of inputs than a number of instances represented by the set of images, the validating input related to whether the metadata generated for the selected object is correct; and associating, by the processor, the intra-video metadata with a selected instance of the selected object only if the validating user input confirms that the selected instance was correctly identified as including the selected object.

13. The method of claim 12, wherein receiving the validating user input comprises receiving, by the processor, a single validating input for all instances represented by the set of images.

14. The method of claim 13, wherein outputting the user interface comprises outputting, by the processor, a user interface comprising a global non-validation control that allows a user to reject validation of all instances represented by the displayed set of images.

15. The method of claim 12, wherein associating the intra-video metadata with a selected instance of the selected object comprises bundling, by the processor, the intra-video metadata with the video content item.

16. The method of claim 12, wherein associating the intra-video metadata with a selected instance of the selected object comprises storing, by the processor, the intra-video metadata separately from the video content item.

17. The method of claim 15, further comprising requesting, by the processor, the video object descriptors after receiving the video content item.

18. A storage device comprising instructions executable by a computing device to:
receive, by a processor of the computing device, an input of a video and/or audio content item;

compare, by the processor, the video and/or audio content item to one or more object descriptors each representing an object for locating within the video and/or audio content item to locate a plurality of instances of one or more of the objects in the video and/or audio content item;

generate, by the processor, metadata for each object located in the video and/or audio content item, the metadata for a corresponding object comprising an identity of the corresponding object;

output, by the processor, to a display device a user interface comprising a set of images representing the plurality of instances at which a selected object is located in the video and/or audio content item; and receive, by the processor, a validating input via the user interface, the validating input comprising a lesser number of inputs than a number of instances represented by the set of images, the validating input related to whether the metadata generated for the selected object is correct.

19. The storage device of claim 18, further comprising instructions executable to display, by the processor, images representing the object descriptors in the user interface, and to receive the validating input by receiving an input selecting an image representing the object descriptor for the selected object.

20. The storage device of claim 18, wherein the user interface comprises a global non-validation control that allows a user to reject validation of all instances represented by the set of images.

* * * * *